United States Patent [19]

Umemoto et al.

[11] Patent Number: 4,788,712
[45] Date of Patent: Nov. 29, 1988

[54] HOWLER INDICATOR IN CORDLESS TELEPHONE SYSTEM

[75] Inventors: Yuji Umemoto; Akio Toki, both of Hino, Japan

[73] Assignee: Kabushiki Kaisha Toshiba, Kawasaki, Japan

[21] Appl. No.: 90,515

[22] Filed: Aug. 28, 1987

[30] Foreign Application Priority Data

Aug. 29, 1986 [JP] Japan ............................ 61-201550

[51] Int. Cl.⁴ .............................................. H01Q 7/04
[52] U.S. Cl. ............................................. 379/63; 379/61
[58] Field of Search ..................... 379/63, 61, 58, 56

[56] References Cited

U.S. PATENT DOCUMENTS

| | | | |
|---|---|---|---|
| 3,763,324 | 10/1973 | Garcia et al. | 379/63 |
| 4,032,723 | 6/1977 | Mendoza | 379/61 |
| 4,138,595 | 2/1979 | Barkwith | 379/61 |
| 4,450,319 | 5/1984 | Lucey | 379/63 |
| 4,481,382 | 11/1984 | Villa Real | 379/61 |
| 4,490,584 | 12/1984 | Lucey | 379/63 |
| 4,562,307 | 12/1985 | Bursztejn et al. | 379/61 |
| 4,568,800 | 2/1986 | Orikasa | 379/63 |
| 4,574,164 | 3/1986 | Orikasa | 379/63 |
| 4,591,661 | 5/1986 | Benedetto et al. | 379/61 |
| 4,723,265 | 2/1988 | Kamei et al. | 379/58 |
| 4,736,410 | 4/1988 | Nishida et al. | 379/354 |

Primary Examiner—Robert Lev
Attorney, Agent, or Firm—Finnegan, Henderson Farabow, Garrett & Dunner

[57] ABSTRACT

In a howler indicator of a cordless telephone system, a howler signal is detected by a howler signal detecting means provided in the master device, the mobile device is informed of the detection of the howler signal by a predetermined command signal transmitted from the master device through a radio line, and in response to this an indicating means provided in the mobile device is activated to prompt the operator to replace or hang up the mobile device correctly for the purpose of putting the mobile device in the ON-HOOK state.

9 Claims, 2 Drawing Sheets

HOWLER INDICATOR IN CORDLESS TELEPHONE SYSTEM

BACKGROUND OF THE INVENTION

1. Field of the Invention

The present invention relates to a howler indicator in a cordless telephone system comprising a master device and a mobile device, and more particularly, to a howler indicator which generates an alarm for prompting the operator to an on-hook action, i.e., generates a howler on the side of a mobile device.

2. Description of the Related Art

As well known, a cordless telephone system comprises a master device connected to a general subscriber's line leading to an exchange or switchboard and a mobile device connected through a radio line to the master device to allow the operator to have a conversation with the party through the mobile device.

A conventional cordless telephone system of the type referred to has been arranged so that when the mobile device is left in its OFF-HOOK state, a howler signal is applied from a switchboard through a general subscriber's line to the master device to warn the operator of the OFF-HOOK state of the mobile device, in which case the master device does not transmit the howler signal through the radio line to the mobile device but flashes a light emitting element LED or gives an alarm sound in accordance with the howler signal on the side of the master device to prompt the operator to hook on the mobile device or cut off the line of the mobile device. However, even when such indication of prompting the ON-HOOK action of the mobile device is provided on the side of the master device, it is disadvantageously impossible for the operator by the mobile device to know the indication so long as the mobile device is located away from the master device. In addition, when the line of the mobile device is cut off on the side of the master device, since the mobile device is left in its OFF-HOOK state, it becomes disadvantageously impossible to sound the mobile device at the time of receiving a new signal. In the prior art system, the howler signal is transmitted to the mobile device from the master device. However, the howler signal is much higher in level than a voice signal so that, for example, when a frequency-modulated (FM) signal is used as carried on the radio line, the direct transmission of the howler signal causes the level of the howling signal received at the mobile device to become remarkably low due to the limitation of the maximum frequency shift, thus disabling the sufficient informing function.

In this way, such a prior art cordless telephone system is arranged so that the indication of prompting the ON-HOOK action of the mobile device is provided on the side of the master device, which results in that when the mobile device is located away from the master device, the operator by the mobile device cannot know the indication. Moreover, the prior art system has such a problem that when the system is arranged to cut off the line of the mobile device on the side of the master device, the mobile device is left in the OFF-HOOK state, whereby the mobile device cannot sound at the time of a signal reception.

OBJECT AND SUMMARY OF THE INVENTION

It is an object of the present invention to provide a howler indicator in a cordless telephone system which provides an indication of prompting an operator to an ON-HOOK action of a mobile device on the side of the mobile device to reliably prevent the mobile device from being left in an OFF-HOOK state.

In accordance with the howler indicator of the cordless telephone system of the present invention, a howler signal is detected by a howler signal detecting means provided in the master device, the mobile device is informed of the detection of the howler signal by a predetermined command signal transmitted from the master device through a radio line, and in response to this an indicating means provided in the mobile device is activated to prompt the operator to replace or hang up the mobile device correctly for the purpose of putting the mobile device in the ON-HOOK state.

In the howler indicator of the cordless telephone system in accordance with the present invention, the application of a howler signal to the master device allows the indicating means provided in the mobile device to prompt the operator to an ON-HOOK action of the mobile device.

In this way, in accordance with the present invention, since the application of a howler signal to the master device enables the operator to be prompted to the ON-HOOK action on the side of the mobile device, it can be positively prevented that the mobile device is left in an OFF-HOOK state, whereby a fine for ignoring the howler tone can be avoided and the battery of the mobile device can be saved, leading to the useful utilization of electromagnetic wave in the cordless telephone system.

DESCRIPTION OF THE PREFERRED EMBODIMENT

An embodiment of the present invention will be detailed with reference to attached drawings.

Figure 1:
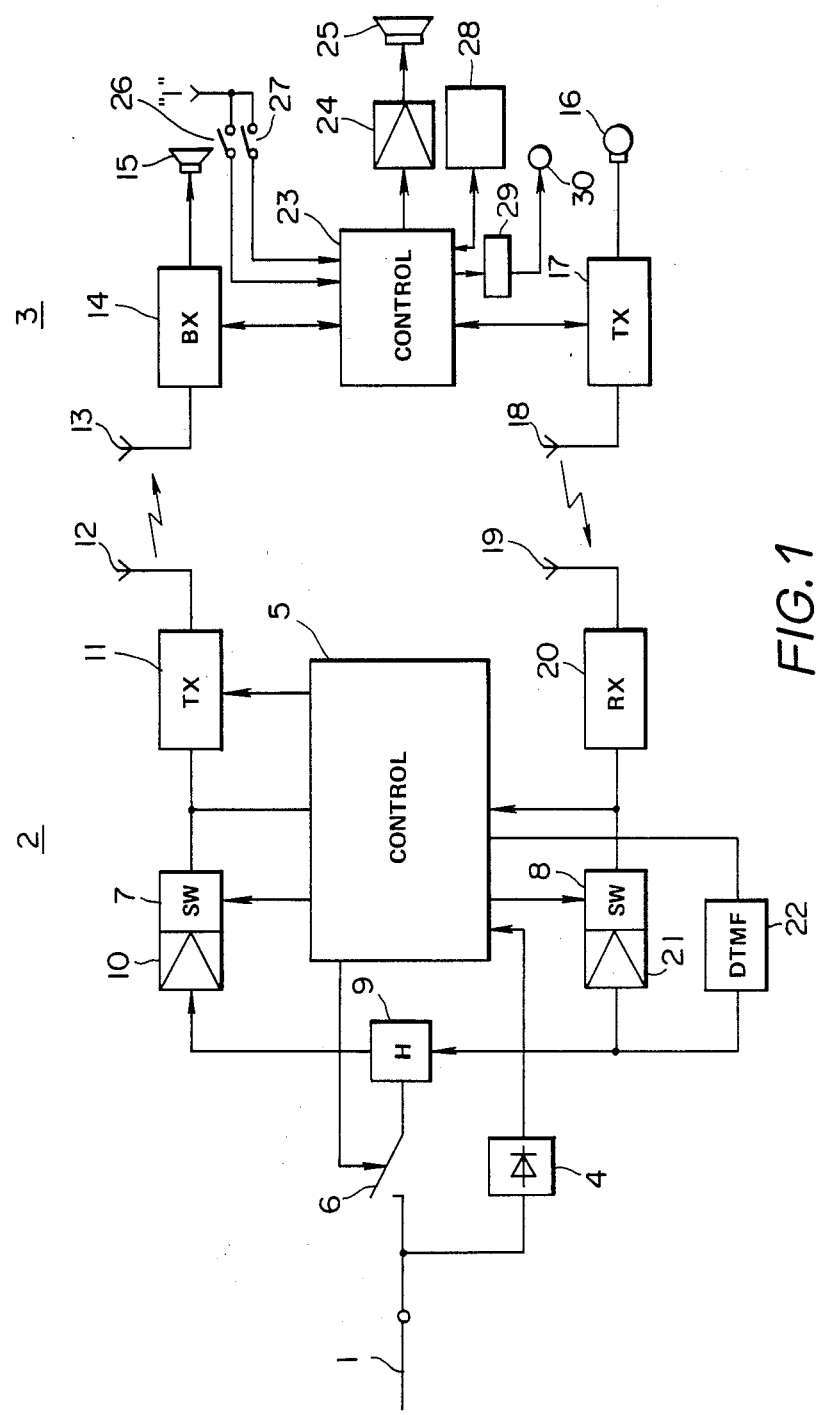
FIG. 1 is a block diagram showing an embodiment of a howler indicator of a cordless telephone system in accordance with the present invention.
Figure 2:
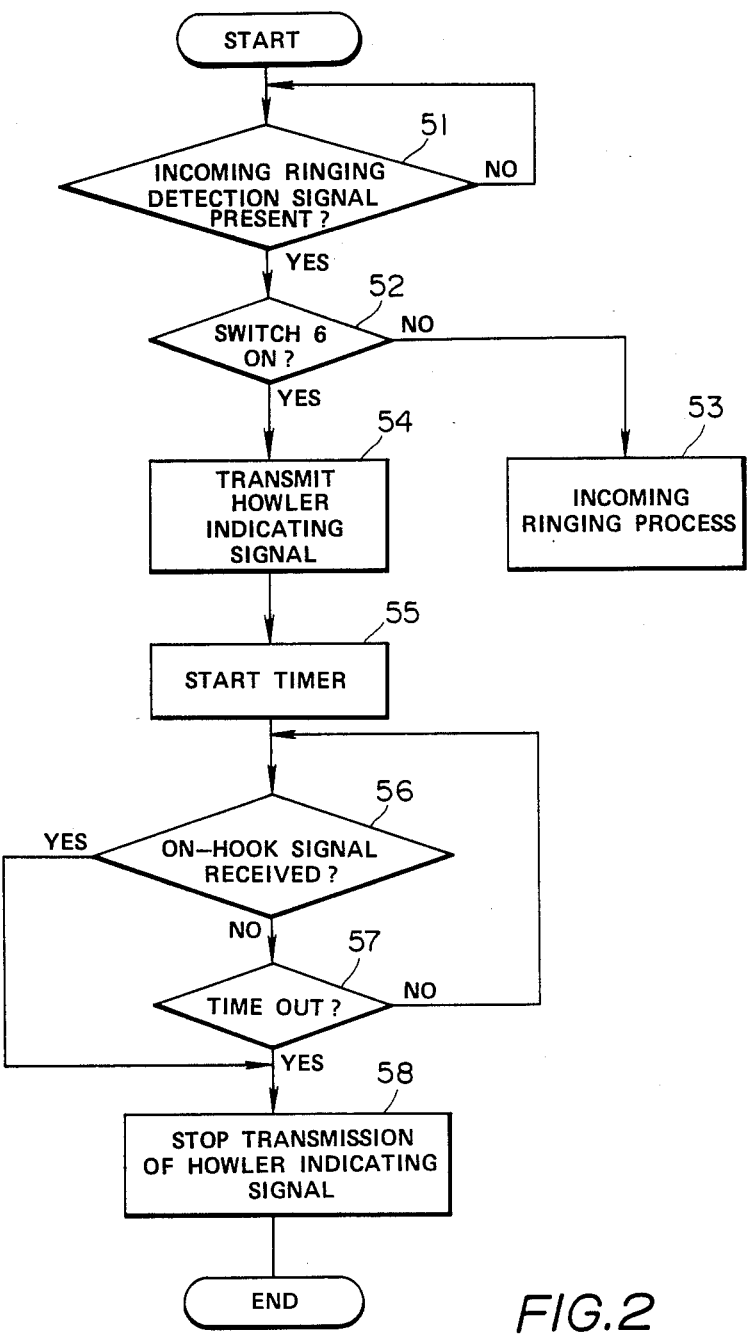
FIG. 2 is a flowchart for explaining the operation of the embodiment.

There is shown in FIG. 1 a block diagram which shows an embodiment of a howler indicator of a cordless telephone system in accordance with the present invention. In FIG. 1, the cordless telephone system comprises a master device 2 connected to a general subscriber's line 1 and a mobile device 3 connected to the master device 2 through a radio line. When the master device 2 is ready to receive a signal and a ringing signal transmitted through the general subscriber's line 1 from an exchange or switchboard (not shown) is applied to a ringing signal detecting circuit 4, the circuit 4 rectifies the ringing signal to form a DC voltage. In the DC voltage exceeds a predetermined threshold value, then the circuit 4 generates an incoming detection signal indicating that the ringing signal has been received and then applies the incoming detection signal to a control circuit 5. The operation of the control circuit 5 is shown by a flowchart in FIG. 2. The control circuit 5, when receiving the incoming detection signal, judges at a step 51 that there exists the incoming detection signal and then judges at a next stage 52 whether or not a switch 6 is turned ON. Since the master device 2 is now in its wait state, the switch 6 is OFF. Thus, the system branches to a step 53 to execute a predetermined incoming processing. That is, the radio line between the master and mobile devices 2 and 3 is established, the switch 6 is turned ON, and a send-signal low frequency switch 7 and a receive-signal low frequency control switch 8 are both turned ON. This causes the establishment of a transmission series path of the general subscriber's line 1, the switch 6, a hybrid circuit 9, a send-signal low frequency amplifying circuit 10, the send-signal low frequency control switch 7, a signal transmitter 11, a signal transmitting antenna 12, a signal receiving antenna 13, a signal receiver 14 and a earpiece 15; and also the establishment of another transmission series path of a mouthpiece 16, a signal transmitter 17, a signal transmitting antenna 18, a signal receiving antenna 19, a signal receiver 20, the receive-signal low frequency control switch 8, a receive-signal low frequency amplifying circuit 21, the hybrid circuit 9, the switch 6 and the general subscriber's line 1. When a call is issued on the side of the mobile device 3 by operating a ringing switch 26, a radio line is established between the master and mobile devices 2 and 3 so that the control circuit 5 causes the switch 6 to be turned ON and also applies to a dual tone multi-frequency (DTMF) signal generator 22 a signal indication of a party dial number designated by the operation of a key pad 28 and transmitted through the radio line. The DTMF signal generator 22, when receiving the party dial number, sends a select signal indication of the party dial number onto the general subscriber's line 1 through the hybrid circuit 9. After this, the control circuit 5 causes the send-signal and receive-signal low frequency control switches 7 and 8 to be both turned ON.

In the case where the mobile device 3 is left to be in its OFF-HOOK state and the switch 6 of the master device 2 is in its ON state, a howler signal for prompting the telephone user to replace the earpiece to set it in the ON-HOOK state is transmitted from the not shown switchboard through the general subscriber's line 1 to the master device 2, and further applied to the ringing signal detection circuit 4 of the master device 2. The circuit 4 rectifies the howler signal to form a DC voltage. In this case, however, since the howler signal has substantially the same level as the ringing signal, the obtained DC voltage exceeds the predetermined threshold value, so that the circuit 4 generates a ringing detection signal similar to that in the ringing-tone reception mode and applied it to the control circuit 5. The circuit 5 receiving the ringing detection signal, first judges at the step 51 that there exists a ringing detection signal and then judges at the step 52 whether or not the switch 6 is in the ON state. At this time, because the switch 6 remains its ON state, the control proceeds to a step 54 where a processing for sending a howler alarm signal to the mobile device 3 is executed. That is, since it is impossible to receive a ringing tone in the OFF-HOOK Mode, the control circuit 5 judges that the system received a howler signal, turns OFF the send-signal low frequency control switch 7 and also applies to the transmitter 11 such a howler alarm signal commanding the emission of a howler tone as, for example, a digital signal having a redundancy and a predetermined format. As a result, the howler alarm signal is transmitted from the transmitter 11 through the sending antenna 12 and the receiving antenna 13 to the receiver 14, and further applied to a control circuit 23 from the receiver 14. As soon as the control circuit 23 receives the howler alarm signal, the circuit 23 judges the input to be the howler alarm signal, and applies a voice signal having a period faster than, for example, the ringing signal, through an amplifier 24 to a loudspeaker 25 which in turn emits an alarm sound to thereby prompt the user to replace the earpiece correctly for ON-HOOK. The alarm sound arrangement may be replaced by such an arrangement that the control circuit 23 applies a light signal through a driving circuit 29 to a light emitting diode 30 to flask the diode and prompt the operator to an on-hook action, or a combination of the sound and light arrangements may be employed. The operator of the mobile device 3 turns ON an on-hook switch 27 on the basis of the audible sound from the loudspeaker 25 of the flashing of the light emitting diode 30 (that is, replaces the earpiece correctly). The ON state of the one-hook switch 27 is detected by the control circuit 23 so that the control circuit 23 generates an on-hook signal that is applied from the control circuit 23 to the control circuit 5 through the control circuit 23, transmitter 17, sending antenna 18, receiving antenna 19 and receiver 20.

After having executed the howler alarm signal sending processing, the control circuit 5 transfers its control to a step 55 to start a predetermined timer. Subsequently, the control circuit 5 transfers its control to a step 56 to judge whether or not the control circuit 5 has received the on-hook signal. If the control circuit 5 judges that it does not receive the on-hook signal yet, it transfers its control to a step 57 to judge whether or not aforementioned predetermined timer has timed over. When the circuit 5 judges at the step 57 that the timer has not timed out yet, the circuit returns its control back to the step 56, and repeats the above operation until it judges its reception of the on-hook signal at the step 56 or until it judges the time-over at the step 57. When the control circuit 5 judges its reception of the on-hook at the step 56 or judges the time out at the step 57, the circuit 5 transfers its control to a step 58. At the step 58, the control circuit executes a processing of stopping the transmission of the howler alarm signal which transmission has been started at the step 54. More specifically, the system is arranged so that when the operator turns ON the on-hook switch 27 on the side of the mobile device 3 in response to the alarm sound from the loudspeaker 25 or the flashing of the light emitting diode 30, the system stops the sounding of the loudspeaker 25 and/or the flashing of the diode 30, and also so that even when the operator fails to turn ON the on-hook switch 27 in response to the sounding of the loudspeaker 25 or the flashing of the diode 30 due to his absence, the system automatically stops the transmission of the howler alarm signal from the control circuit 5 a predetermined time after the initial transmission of the howler alarm signal to terminate the sounding of the speaker 25 and/or the flashing of the diode 30.

As has been disclosed in the foregoing, according to the present embodiment, when a howler signal is applied to the master device 2, the operator on the side of the mobile device 3 can be informed of the on-hook replacing command. As a result, the operator can know the OFF-HOOK state of the mobile device 3 and quickly put the mobile device 3 in its ON-HOOK state.

With such an arrangement as mentioned in the foregoing. the control circuit 5 in the master device 2 may be arranged not only to apply the signal indication of the reception of the howler signal to the transmitter 11 but also to turn OFF the switch 6 and cut off the line of the mobile device 3 when the circuit 5 judges its reception of the howler signal. In addition, the howler alarm signal has been transmitted in the form of a digital command signal from the master device 2 to the mobile device 2 in the foregoing arrangement, but the howler alarm signal may be transmitted in the form of a predetermined tone signal.

What is claimed is:

1. A howler indicator in a cordless telephone system comprising:
    a master device connected to a subscriber's line;
    a mobile device connected through a radio line to said master device;
    means provided in the master device for detecting a howler signal applied thereto through said line;
    means provided in said mobile device for informing an operator of on-hook prompting;
    means for transmitting a predetermined command signal indication of presence of said howler signal detected by said howler signal detecting means from the master device through said radio line to the mobile device; and
    means for initiating said informing means in response to said command signal transmitted from the master device.

2. A howler indicator in a cordless telephone system as set forth in claim 1, wherein a ringing signal detecting circuit provided in said master device is also used as said howler signal detecting means.

3. A howler indicator in a cordless telephone system as set forth in claim 2, wherein said howler signal detecting means judges said howler signal to be applied thereto from said line when an incoming ringing detection signal is outputted from said ringing signal detecting circuit in an OFF-HOOK Mode.

4. A howler indicator in a cordless telephone system as set forth in claim 1, wherein said informing means includes audible informing means.

5. A howler indicator in a cordless telephone system as set forth in claim 4, wherein said informing means includes a loudspeaker.

6. A howler indicator in a cordless telephone system as set forth in claim 1, wherein said informing means includes a visible informing means.

7. A howler indicator in a cordless telephone system as set forth in claim 6, wherein said informing means includes a light emitting diode.

8. A howler indicator in a cordless telephone system as set forth in claim 1, wherein said informing means includes a combination of said audible and visible informing means.

9. A howler indicator in a cordless telephone system as set forth in claim 1, wherein said transmitting means transmits a digital command signal as said predetermined command signal.

* * * * *